Figure 1:
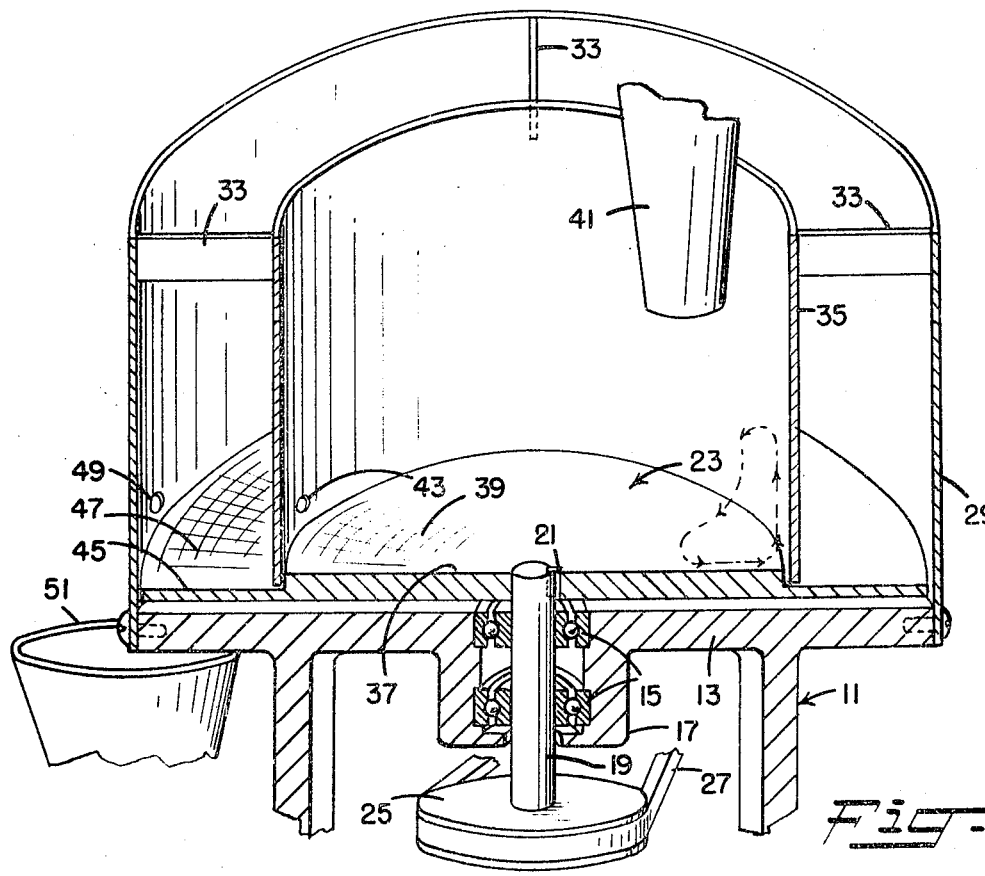

United States Patent
Strobert

[11] 3,743,464
[45] July 3, 1973

[54] CONTINUOUS SPHERING APPARATUS

[75] Inventor: Samuel S. Strobert, Wilmington, Del.

[73] Assignee: FMC Corporation, Philadelphia, Pa.

[22] Filed: Aug. 24, 1971

[21] Appl. No.: 174,377

[52] U.S. Cl.................. 425/222, 425/8, 264/8, 425/332, 425/402
[51] Int. Cl............................................. B29c 23/00
[58] Field of Search .................. 425/6, 222, 8, 332, 425/402; 264/8

[56] References Cited
UNITED STATES PATENTS

| R27,214 | 11/1971 | Nakahara | 425/222 |
| 3,329,746 | 7/1967 | Joyce et al. | 425/8 X |
| 3,393,986 | 7/1968 | Firnhaber | 264/8 X |
| 3,596,312 | 8/1971 | Ohmatsu | 264/8 X |

FOREIGN PATENTS OR APPLICATIONS

| 1,124,488 | 6/1956 | France | 425/8 |

Primary Examiner—Robert L. Spicer, Jr.
Attorney—Thomas R. O'Malley et al.

[57] ABSTRACT

Apparatus for use in continuous sphering of particles by centrifugal and frictional forces.

8 Claims, 2 Drawing Figures

PATENTED JUL 3 1973    3,743,464

CONTINUOUS SPHERING APPARATUS

The present invention is directed to an improved apparatus for use in continuous sphering operations of small particles by centrifugal and frictional forces.

Disclosed in U.S. Pat. No. 3,277,520 is a method and apparatus for rapidly converting solid materials by means of inter-particle rolling friction into spheres which possess a low degree of friability and exhibit uniformity in size as well as internal and surface characteristics. One embodiment of such disclosed apparatus is designed for batch sphering operations and consists, essentially, of a stationary vertical cylinder and a plate disposed within the cylinder and adapted to be rotated about the cylinder axis at a high speed. The internal surface of the vertical cylinder is smooth, while the uppermost surface of the rotatable plate is roughened along the annular area thereof adjacent to its periphery.

In the operation of the above described apparatus, a mass of granules of moistened matrial is delivered onto the plate as it is rotated at high speed and is propelled centrifugally toward the plate periphery. As granules in the mass of granules reach the internal surface of the cylnder their momentum causes them to rise and, as this energy is dissipated, the granules fall by gravity toward the center of the plate where they are again subjected to centrifugal forces. Of couse, the forces acting upon the individual granules within the mass of granules will differ so that such granules will move relative to each other at different velocities and will cause the mass itself to simply eddy along the internal surface of the cylinder.

During travel of the granules toward the plate periphery, the roughened surface of this rotating plate imparts a rolling motion to the granules which, together with the rubbing of granules upon each other, effects the sphering thereof. Once the desired spheres are formed, the plate is stopped and the cylinder is emptied in preparation for a following batch of granules.

Described also in the above cited patent is an apparatus which includes a stationary cylinder within which are mounted a series of vertically spaced rotatable plates. These plates, referred to by the patentee as indented plates, are fixed to a common shaft and are roughened along the uppermost surfaces thereof. All of these plates, except the lowermost of the series, are provided with openings near the center thereof. Covering plates are also fixed to the common shaft over and in spaced relationship with the indented plates to control the passage of granules through the openings therein. Adjacent to the lowermost of the indented plates, the stationary cylinder is provided with a discharge opening, the lowermost portion of which is closed by a suitable cover.

In the operation of this embodiment, the common shaft is rotated at a high speed and granules of moistened material are continuously delivered onto the uppermost of the covering plates. From such plate the granules are centrifugally discharged onto the roughened surface of the uppermost of the indented plates where they are under the influence of forces as described in the first mentioned embodiment. With only a partial sphering of the granules being effected on the uppermost of such indented plates, the granules pass through the openings therein and onto another of the covering plates. Here again the granules are centrifugally discharged therefrom onto a lower indented plate where their sphering is continued.

After the granules have been passed sequentially along the alternate covering and indented plates and are received upon the lowermost of the indented plates, they are centrifugally propelled toward the cylinder discharge opening. At such opening, the now formed spheres flow over the cover thereof and are collected.

In the last described embodiment, the openings in all of the indented plates above the lowermost of such plates is defined by a plurality of spaced, radially extending arms. The patentee has recognized that these arms may well strike and crush granules as they pass from an indented plate onto a lower covering plate and has suggested that the leading edge of such arms be shaped to a knife edge. Certainly the construction described by the patentee will minimize crushing of granules but does not, however, eliminate this problem.

Significant also with respect to this last described embodiment is that the plurality of indented and covering plates and plate spacers requires a heavy drive shaft and a drive means of large capacity. Such apparatus is therefore rather bulky and expensive to operate. Accordingly, a primary object of this is to provide a new or generally improved and more satisfactory apparatus for use in a continuous sphering process.

Another object of this invention is the provision of an improved apparatus for use in continuous sphering operations.

Still another object of this invention is to provide an improved apparatus for use in the continuous and rapid manufacture of spheres of uniform size.

A further object is to provide an improved sphering apparatus which is simple in construction and use, possesses a desired flexibility whih permits its application with a variety of different materials and/or varying operating conditions, and is eminently suited for use in continuous production of spheres from granular or powdered materials.

These and other objects of the invention are achieved by an apparatus which includes a plurality of concentric, radially spaced cylinders supported in stationary positions with their axes disposed vertically, a plate extending across the cylinder openings at the lowermost ends thereof, and means for rotating such plate about an axis coincident with the axes of the cylinders whereby material on the rotating plate is centrifugally propelled toward the internal surfaces of the stationary cylinders. The internal surfaces of the cylinders are smooth, while the top surface of the plate is roughened at least along an annular area thereof adjacent to the internal surface of the innermost cylinder so as to impart a rolling motion to material which is to be sphered as it is centrifugally propelled.

Extending through each cylinder wall is a discharge opening which is substantially greater in size than the individual spheres which are to be formed. These openings are spaced above the top surface of the plate which is adjacent thereto, with the size of the respective openings and perhaps their locations relative to the top surface of the plate serving to control the volume of material flowing therethrough. Located outwardly of the outermost stationary cylinder are means for collecting the formed spheres after their passage through the discharge opening therein.

The rotatable plate is in the form of a disk having a central portion surrounded by at least one concentric annular portion. The top surface of each disk portion is disposed in a plane extending substantially perpendicular to the disk axis and is at a higher elevation than the top surfaces of all disk portions located outwardly thereof.

Projecting into the innermost of the plurality of cylinders is the disk central portion, which is only slightly smaller than the inside diameter of such cylinder. With little space between the central portion of the disk and the internal surface of the innermost cylinder free disk rotation is facilitated while minimizing the tendency for material to wedge or escape along the periphery of this disk portion.

The annular portions of the disk each extend between a separate pair of adjacent cylinders. Each of the annular portions projects into and is of a diameter slightly less than the outermost of the adjacent cylinders between which it extends to minimize wedging and escape of materials. If desired, the top surfaces of all or selected of such annular portions surfaces may be roughened to impart a rolling motion to material as it is centrifugally propelled thereover.

The discharge openings in the cylinder walls are, as heretofore mentioned, substantially greater in size than the individual spheres which are to be formed. Desirably, but not necessary, all of such openings are of like size and shape. In lieu of a single large discharge opening, a series of smaller discharge openings, which together are capable of handling the desired volume of material, may be provided in all or selected of the stationary cylinders.

In the operation of the apparatus of the present invention, the disk is rotated at high speed and the material which is to be sphered is dlivered continuously onto the top surface of the disk central portion.

As in known sphering operations, the material which is to be sphered is moistened and preferably extruded in pellet form, which pellets are then delivered continuously to the apparatus of the present invention.

The speed at which the disk is rotated will vary with such factors as the particular material which is being sphered, the roughness of the top surfaces of the different disk portions, the degree to which the pellets are to be sphered, etc., and may range, for example from about 200 to 1,600 rpm. As suggested above, the disk surface roughness may also be varied. Excessive roughness may seriously impede the movement of moistened pellets over the disk surfaces and should, of course, be avoided. Satisfactory roughness along the top surfaces of the disk may be provided by milling therein intersecting grooves of from 1 to 3 mm. in depth and from 2 to 5 mm. spacing.

Once received upon the disk central portion, the pellets within the mass of delivered pellets are centrifugally propelled toward the periphery thereof. The roughened top surface of this disk portion imparts a rolling motion to the pellets which assists in the sphering thereof. As the centrifugally propelled pellets reach the smooth internal surface of the innermost cylinders, their momentum carries them upwardly. Some of such pellets will pass through the opening in the wall of this cylinder. Other of these pellets will fall, by gravity, onto the surface of this disk portion as their momentum is dissipated and are then again under the influence of the centrifugally propelling forces. Since the individual pellets of the mass of pellets on this central portion of the disk are subjected to forces of different magnitudes, they move at different velocities and impart to the entire mass of pellets a churning movement spirally along the internal surface of the innermost cylinder.

The pellets which are discharged from the innermost cylinder are received upon the top surface of the disk annular portion surrounding the central portion. This mass of pellets is likewise propelled toward the internal surface of the next adjacent stationary cylinder, with the friction between pellets and their rolling motion serving to further the sphering thereof. Under the forces heretofore mentioned, this mass will also churn spirally along the internal surface of the cylinder, with some of such pellets passing through the cylinder discharge opening. The pellets so discharged may be subjected to still further sphering action as described above on subsequent annular portions of the disk or may be collected.

During continuous operation, equilibrium conditions are attained wherein the mass of pellets entering each of the cylinders equals the rate at which pellets are discharged therefrom. The size of the cylinder discharge opening will determine the residence period of pellets within any particular cylinder. Obviously, extending the period of residence of pellets within each or any particular cylinder facilitates a greater working of the pellets into spherical shapes but involves some sacrifice in the rate at which spheres are produced. The period of residence of the pellets in any particular cylinder will depend upon such factors as the degree of pellet shaping desired, the number of cylinders within which such pellets are treated before being collected; the speed of disk rotation; the particular material being sphered, etc.

The apparatus of the present invention is not limited to any particular number of stationary cylinders or spacing thereof. Desirably, the cylinders are supported in their stationary positions by suitable means which permits selected of such cylinders to be removed.

Figure 2:
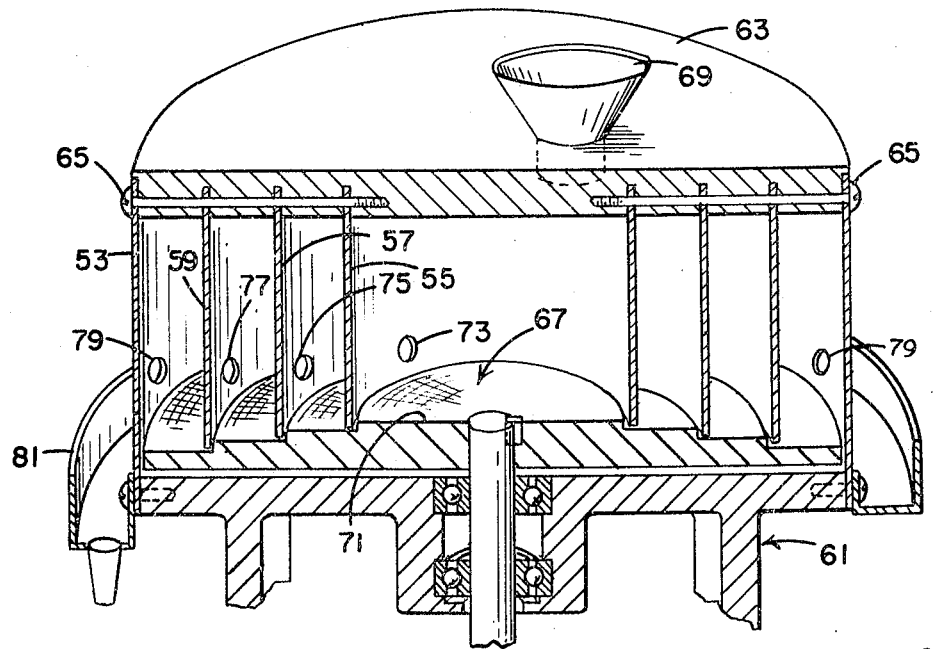

In the drawing,

FIG. 1 illustrates, in section, a perspective view of the apparatus of the present invention; and FIG. 2 is a view similar to FIG. 1 showing a modified embodiment of the apparatus of the present invention.

With reference to the drawing, character 11 indicates a stationary base or frame having a circular top plate 13. Bearings 15, mounted within a housing 17, rotatably support a shaft 19 which extends centrally through the top plate 13. Located above the top plate 13 and keyed at 21 to the uppermost end of the shaft 19 is a disk 23 having a diameter slightly less than that of the top plate 13. The shaft 19 is driven by a suitable motor, not shown, through a pulley 25 fixed to its lower end and a endless belt 27.

A cylinder 29 is secured by screws 31 to the periphery of the plate 13 and, by a series of spaced arms 33, supports a concentric cylinder 35 in suspended position over the disk 23. The central portion of the disk 23, indicated at 37, is of greater thickness than the remainder of such disk and projects into the cylinder 35. To facilitate free rotation of the disk 23 the disk portion 37 is of a diameter slightly less than the inside diameter of cylinder 35. The cylinder 29 and 35 are both formed with smooth internal surfaces, while the uppermost surface of the disk portion 37 is roughened, as indicated at 39, by milling fine intersecting grooves therein.

Materials to be sphered, preferably in pellet form are delivered through a hopper 41 onto the roughened surface 39 of the rotating disk 23 and are centrifugally propelled along such roughened surface toward the smooth internal surface of the cylinder 35. As pellets of the delivered mass of pellets approach the periphery of the disk portion 37, their residual momentum causes them to rise up along the smooth internal surface of the fixed cylinder 35, with some of such pellets passing through the discharge opening 43 and into the cylinder 29. As the momentum of the pellets remaining within the cylinder 35 is dissipated, such pellets fall by gravity and are again centrifugally propelled. While the above described path of individual pellets may be generally similar to that as indicated by broken lines in FIG. 1, pellets within the mass of pellets are moved at different velocities and in different directions so that the mass of pellets itself travels helically along the internal surface of the cylinder 35 with a churning motion.

During travel along the roughened surface of the disk portion 37 the pellets assume a rolling motion which, together with the friction developed between pellets, serves to sphere the same. Throughout the sphering operation, pellets will flow continuously through the discharge opening 43 and onto the annular disk portion 45. The size of the discharge opening 43 will, of course, control the resendence period of the pellets and the degree of sphering which occurs within the cylinder 35.

Preferably, the top surface of the annular disk portion 45 is also roughened as indicated at 47. The pellets between the cylinders 29 and 35 undergo continued sphering in a manner as heretofore described, with a continuous flow of finished spheres passing through a discharge opening 49 in the cylinder 29 and into a collection hopper 51. Normally, the finished spheres are dried to a desired moisture content to insure retention of their spherical shapes.

The embodiment of the apparatus shown in FIG. 2 differs from that heretofore described by employing larger numbers of cylinders, as indicated at 53, 55, 57 and 59. The cylinder 53 is fixed to a stationary base 61, and, by means of a cap 63 and screws 65, supports the cylinders 55, 57 and 59 in suspended positions over a disk 67.

This modified apparatus operates in the same manner as that shown in FIG. 1. With the disk 67 being rotated at high speed pellets of moistened material are delivered through a hopper 69 onto the disk central portion 71 where they are partially sphered. A continuous flow of such pellets passes through a discharge opening 73 in the cylinder 55 and subsequently, and in sequence, through openings 75, 77 and 79. Sphering of such pellets will occur during their resendence between the adjacent cylinders, in a manner as heretofore described. As illustrated, the cylinder 53, as well as any other of the cylinders 55, 57 and 59, may be provided with a plurality of discharge openings 79 and thus a trough 81 is fixed to the base to facilitate collection of the finished spheres.

The apparatus shown in FIG. 2 offers great flexibility in operation in that any of the individual cylinders 55, 57 and 59 may be independently eliminated or replaced by cylinders having discharge openings of different size.

It is to be understood that changes and variations may be made without departing from the spirit and scope of the present invention as defined in the appended claims.

I claim:

1. Apparatus for sphering materials including walls defining a plurality of concentric, telescoped, radially spaced cylinders each having a smooth internal surface, means supporting said cylinders in stationary positions with their axes disposed vertically, a rotatable disk extending across the lowermost ends of said cylinders with the axis of said disk being coincident with the axes of said cylinders and with adjacent, opposing surfaces of said disk and cylinders being spaced from each other only to such extent as to permit unobstructed rotation of said disk, means for rotating said disk about its axis, means for delivering material which is to be sphered into the innermost of said cylinders through the uppermost end thereof, a discharge opening, which is substantially greater in size than the spheres which are to be formed, extending through the wall of each of said cylinders at selected locations above said disk whereby, upon rotation of said disk, material delivered into the innermost of said cylinders is centrifugally propelled along said disk, and in sequence, through all of said cylinders, with the respective discharge openings facilitating the flow of such material successively from the innermost to and through the outermost of said cylinders, the top surface of said disk being roughened at least along an annular area thereof adjacent to the internal surface of said innermost cylinder to cause the material which is delivered thereon to assume a rolling motion as it is centrifugally propelled, and means outwardly of the outermost of said cylinders for collecting the sphered material as it issues from the discharge opening therein.

2. Apparatus as defined in claim 1 wherein said disk includes a central portion which projects into the innermost of said cylinders, said disk central portion being of a diameter which is only slightly less than the inside diameter of said innermost cylinder so as to permit unobstructed rotation of said disk, with its top surface disposed in a plane which is substantially perpendicular to the disk axis and being at a higher level than that of the remainder of said disk.

3. Apparatus as defined in claim 2 wherein said disk includes annular portions encircling said central portion, each of said annular portions extending between a separate pair of adjacent cylinders and projecting into and having a diameter which is only slightly less than the outermost of the respective adjacent cylinders between which it extends, so as to permit unobstructed rotation of said disk.

4. Apparatus as defined in claim 3 wherein the top surfaces of said annular portions are disposed in planes which are substantially perpendicular to the disk axis, and wherein the surface of each of said annular portions is at a lower level than the top surface of the annular portions inwardly thereof.

5. Apparatus as defined in claim 4 wherein at least some of the top surfaces of said annular portions are roughened.

6. Apparatus as defined in claim 4 wherein the discharge openings in the walls of said cylinders are of generally like size and are each spaced a generally like distance above the top surface of said disk which is immediately adjacent to and inwardly of the cylinder through which the respective discharge opening extends.

7. Apparatus as defined in claim 4 wherein the wall of at least the outermost of said cylinders is provided with a plurality of discharge openings therein located above the adjacent top surface of said disk.

8. Apparatus as defined in claim 7 wherein said collecting means includes a stationary trough extending outwardly of and around said disk, said trough having a discharge chute and an inclined bottom wall for conveying to said chute spheres of material deposited thereon.

* * * * *